(12) United States Patent
Chi

(10) Patent No.: US 7,971,704 B2
(45) Date of Patent: Jul. 5, 2011

(54) MICROPIPETTE SORTING AND PACKAGING SYSTEM

(76) Inventor: Yi-Ming Chi, Tao Yuan (TW)

( * ) Notice: Subject to any disclaimer, the term of this patent is extended or adjusted under 35 U.S.C. 154(b) by 284 days.

(21) Appl. No.: 12/468,142

(22) Filed: May 19, 2009

(65) Prior Publication Data

US 2010/0294620 A1    Nov. 25, 2010

(51) Int. Cl.
*B65G 47/12* (2006.01)
(52) U.S. Cl. ............... 198/756; 198/397.01; 198/757
(58) Field of Classification Search ........... 198/397.01, 198/521, 550.01, 550.2, 550.4, 756, 757
See application file for complete search history.

(56) References Cited

U.S. PATENT DOCUMENTS

| | | | | |
|---|---|---|---|---|
| 4,655,338 A | * | 4/1987 | Hershey et al. ............ 198/395 |
| 4,733,520 A | * | 3/1988 | Rabbi ............................ 53/559 |
| 4,825,995 A | * | 5/1989 | Nalbach ........................ 198/380 |
| 5,016,397 A | * | 5/1991 | Higginbotham .............. 451/190 |
| 5,065,852 A | * | 11/1991 | Marti ............................ 198/392 |
| 6,059,518 A | * | 5/2000 | Hamilton ....................... 414/754 |
| 6,161,675 A | * | 12/2000 | Graham ......................... 198/391 |
| 6,195,876 B1 | * | 3/2001 | Koyama et al. ................ 29/740 |
| 6,616,494 B1 | * | 9/2003 | Nagata et al. ..................... 445/9 |
| 6,644,460 B2 | * | 11/2003 | Gertitschke et al. .......... 198/392 |
| 6,875,402 B2 | * | 4/2005 | Hirota et al. ................... 422/504 |
| 7,258,222 B2 | * | 8/2007 | Marti Sala et al. ........... 198/393 |
| 7,270,229 B2 | * | 9/2007 | Perazzo et al. ............. 198/550.4 |
| 7,451,869 B2 | * | 11/2008 | Kato et al. ................. 198/750.8 |
| 7,731,469 B2 | * | 6/2010 | Narita et al. ............. 414/222.01 |
| 7,743,964 B2 | * | 6/2010 | Maeda ...................... 228/180.22 |
| 7,789,215 B1 | * | 9/2010 | Snyder ........................... 198/391 |

* cited by examiner

*Primary Examiner* — Douglas A Hess
(74) *Attorney, Agent, or Firm* — patenttum.us

(57) ABSTRACT

A micropipette sorting and packaging system includes a base, a XY platform, a carrying platform, a vibration tray, an automatic discharge mechanism and a control unit. With the installation of the automatic discharge mechanism, a conventional sorting and packaging design adopting a robotic arm is replaced to reduce occupied space and lower installation costs.

5 Claims, 6 Drawing Sheets

MICROPIPETTE SORTING AND PACKAGING SYSTEM

FIELD OF THE INVENTION

The present invention relates to a micropipette sorting and packaging system, in particular to a system for separating a solid from other solids such as a device for separating solids and applicable for loose objects like bulk materials.

BACKGROUND OF THE INVENTION

In general, a conventional micropipette sorting and packaging method as shown in FIG. 1 uses a vibration tray 1 to guide each micropipette 2 into a sorting rail 3, and then clamps the micropipette 2 by a robotic arm 4, and finally sends the micropipette 2 to a packaging tray. However, this method adopts the robotic arm and has the following disadvantages. Firstly, the size of robotic arm occupies a relatively large space. Secondly, the robotic arm incurs a higher cost. Thirdly, the robotic arm is generally driven by an air compressor, and the air compressor occupies additional space for the installation of the air compressor, and a motor of the air compressor produces noisy sounds when the air compressor is operated.

It is a main subject of the present invention to develop a micropipette sorting and packaging system to replace the traditional sorting and packaging design that adopts the robotic arm, so as to reduce occupied spaces, lower installation costs and avoid noisy sounds.

SUMMARY OF THE INVENTION

In view of the aforementioned shortcomings of the conventional micropipette sorting and packaging system, the inventor of the present invention based on years of experience in the related industry to conduct extensive researches and experiments, and finally developed a micropipette sorting and packaging system in hope of reducing occupied spaces, lowering installation costs, and preventing sound pollutions.

To achieve the foregoing objective, the present invention provides a micropipette sorting and packaging system, comprising: a base; a XY platform, installed on the base, and moved in X-axis and Y-axis directions on the base; a carrying platform, installed on the XY platform; a vibration tray, installed on the base, and having a sorting rail disposed at an external rim of the vibration tray for sorting a micropipette; an automatic discharge mechanism, having a long-strip rail, and an upper end of the long-strip rail having a feeding inlet and a stop portion, and a lower end of the long-strip rail having an outlet and a sensor, and the feeding inlet being coupled to the sorting rail, and the outlet being situated at the carrying platform; and a control unit, electrically coupled to the vibration tray, the automatic discharge mechanism and the XY platform, for controlling a sorting and packaging process.

Therefore, a micropipette sorting and packaging system of the present invention can reduce occupied spaces, lower installation costs, and avoid noisy sounds.

DESCRIPTION OF THE PREFERRED EMBODIMENTS

Other features and advantages of the present invention will become apparent in the following detailed description of the preferred embodiments with reference to the accompanying drawings.

Figure 1:
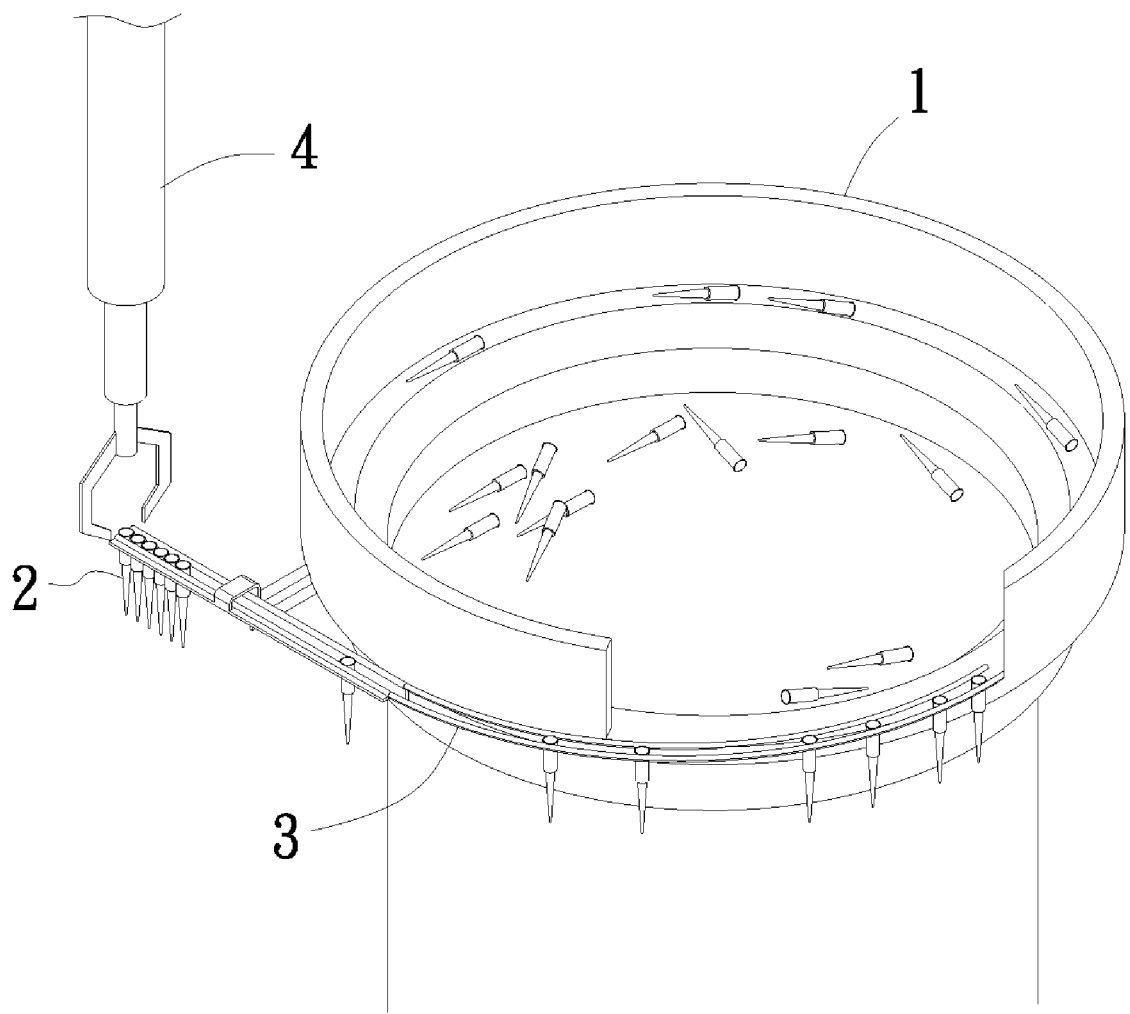
FIG. 1 is a schematic view of a conventional micropipette sorting and packaging mechanism.
Figure 2:
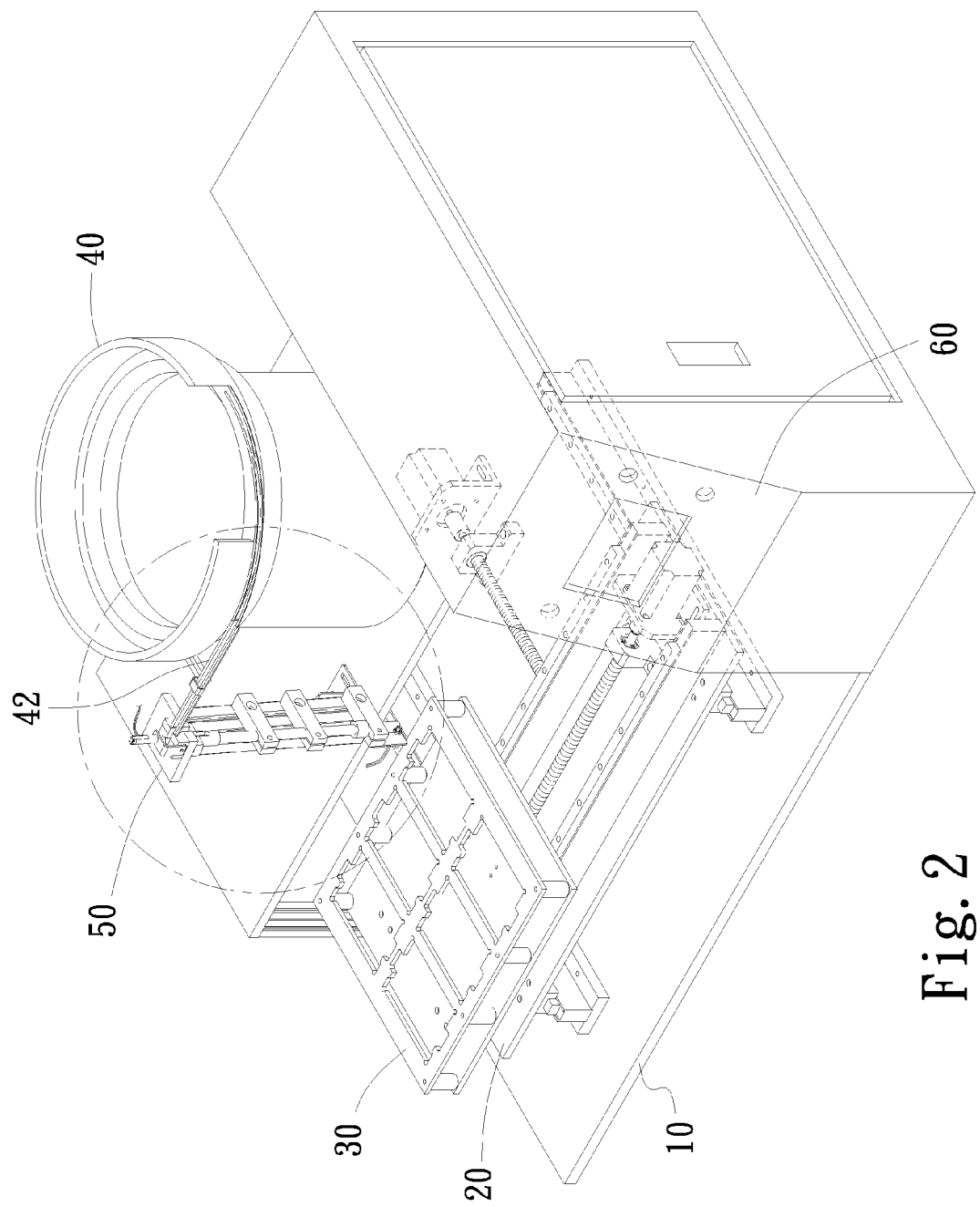
FIG. 2 is a perspective view of a micropipette sorting and packaging system in accordance with a preferred embodiment of the present invention.

With reference to FIG. 2 for a perspective view of a micropipette sorting and packaging system in accordance with a preferred embodiment of the present invention, the micropipette sorting and packaging system comprises a base 10, a XY platform 20, a carrying platform 30, a vibration tray 40, an automatic discharge mechanism 50 and a control unit 60.

The XY platform 20 is installed on the base 10 and moved in X-axis and Y-axis directions. The carrying platform 30 is installed on the XY platform 20 for moving the XY platform 20 and changing a carrying position. The vibration tray 40 is installed on the base 10, and the vibration tray 40 has an internal rim higher than an external rim of the vibration tray 40, and a sorting rail 42 is disposed at the external rim of the vibration tray 40 for sorting a micropipette (not shown in the figure).

Figure 3:
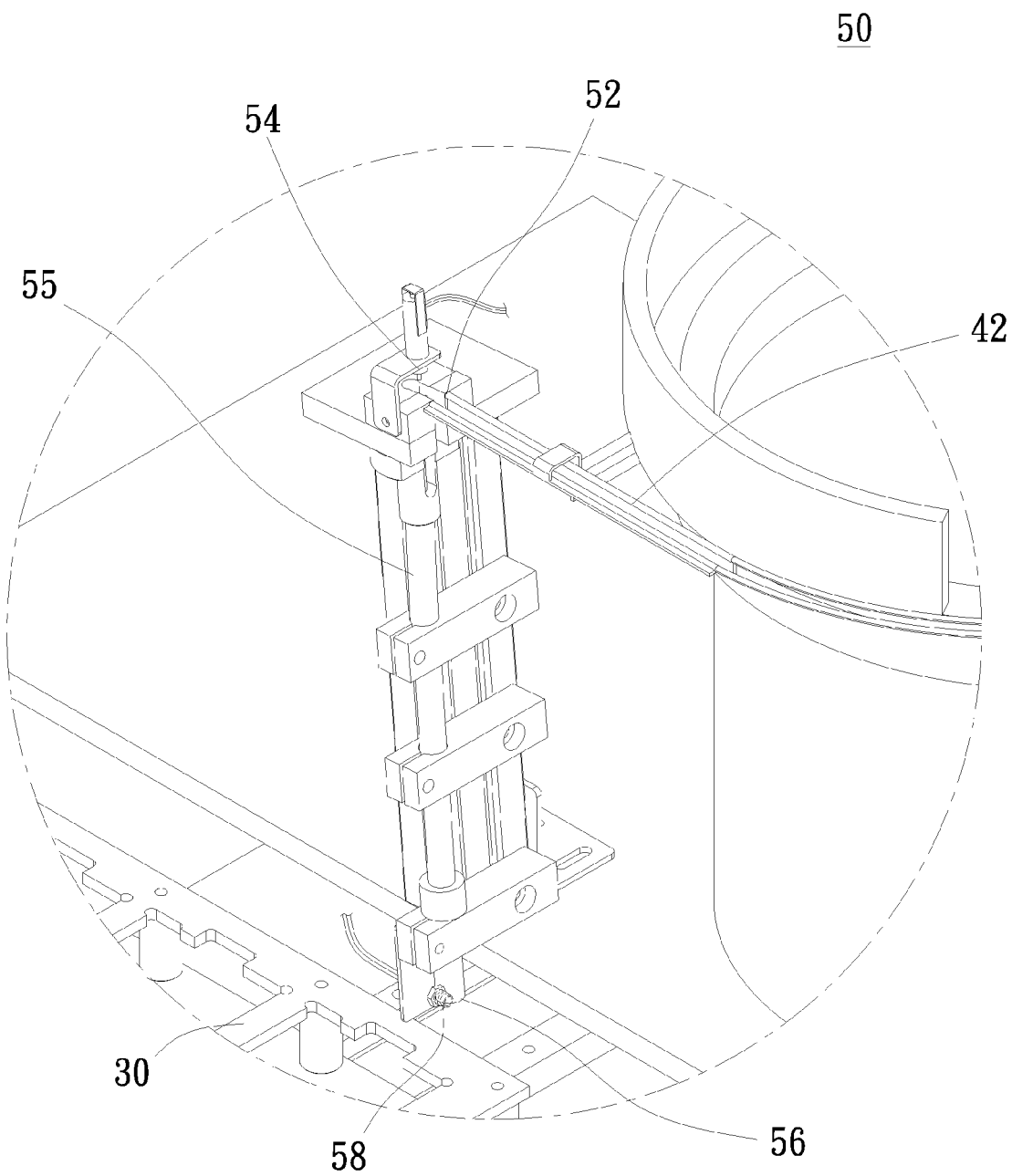
FIG. 3 is a schematic enlarged view of an automatic discharge mechanism of a micropipette sorting and packaging system in accordance with a preferred embodiment of the present invention.

With reference to FIG. 3 for a schematic enlarged view of an automatic discharge mechanism of a micropipette sorting and packaging system in accordance with a preferred embodiment of the present invention, the automatic discharge mechanism 50 includes a long-strip rail 55, and an upper end of the long-strip rail 55 includes a feeding inlet 52 and a stop portion 54, and a lower end of the long-strip rail 55 includes an outlet 56 and a sensor 58. The feeding inlet 52 is coupled to the sorting rail 42. The stop portion 54 is driven by an electromagnetic force or a mechanical force. The outlet 56 is aligned with the carrying platform 30. The sensor 58 is an infrared sensor.

The control unit 60 is electrically coupled to the vibration tray 40, the automatic discharge mechanism 50 and the XY platform 20 for controlling the sorting and packaging process.

Figure 4A:
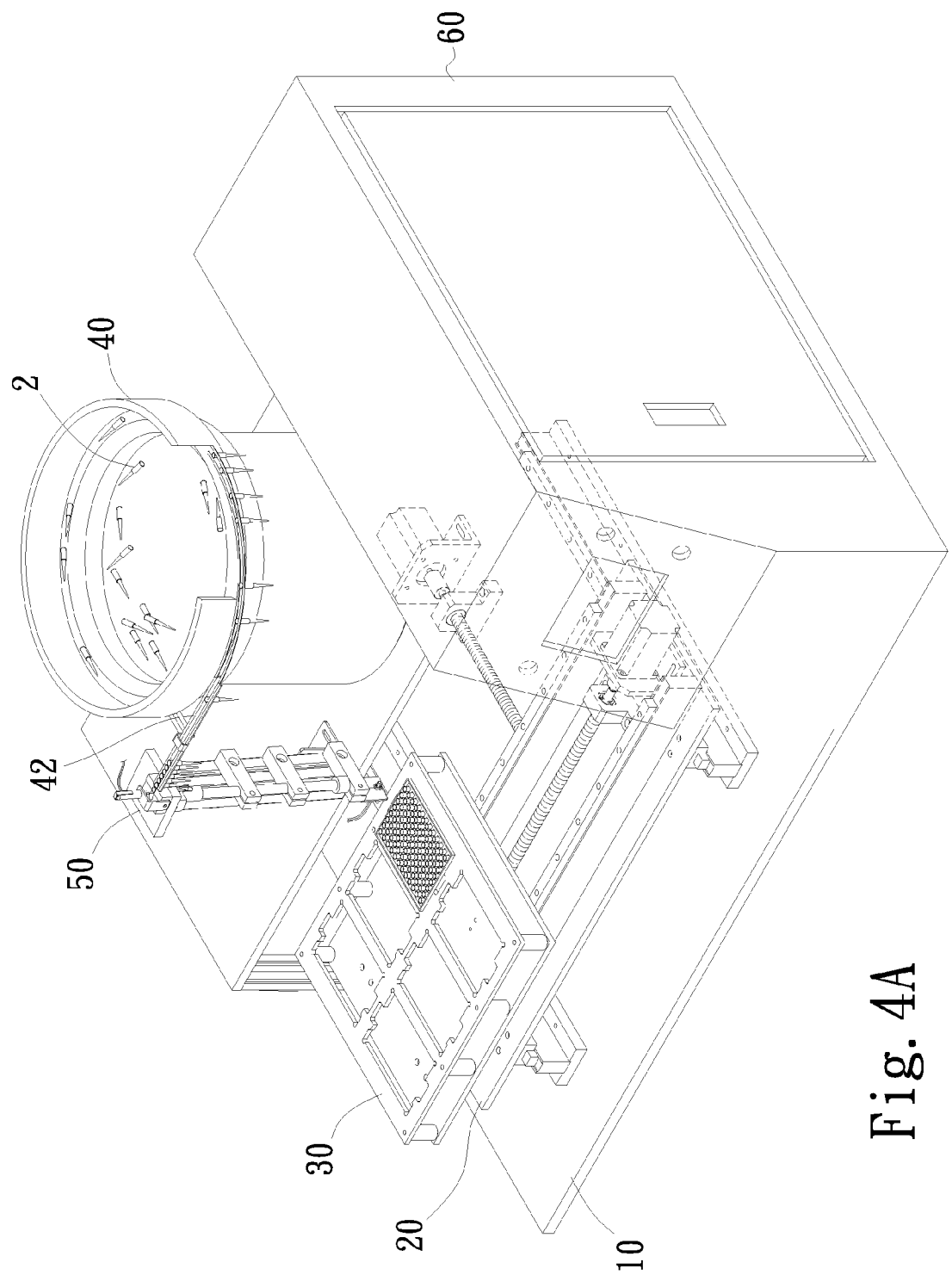
FIGS. 4A, 4B and 4C are schematic views of a micropipette sorting and packaging system provided for sorting and packaging the micropipette in accordance with a preferred embodiment of the present invention.
Figure 4B:
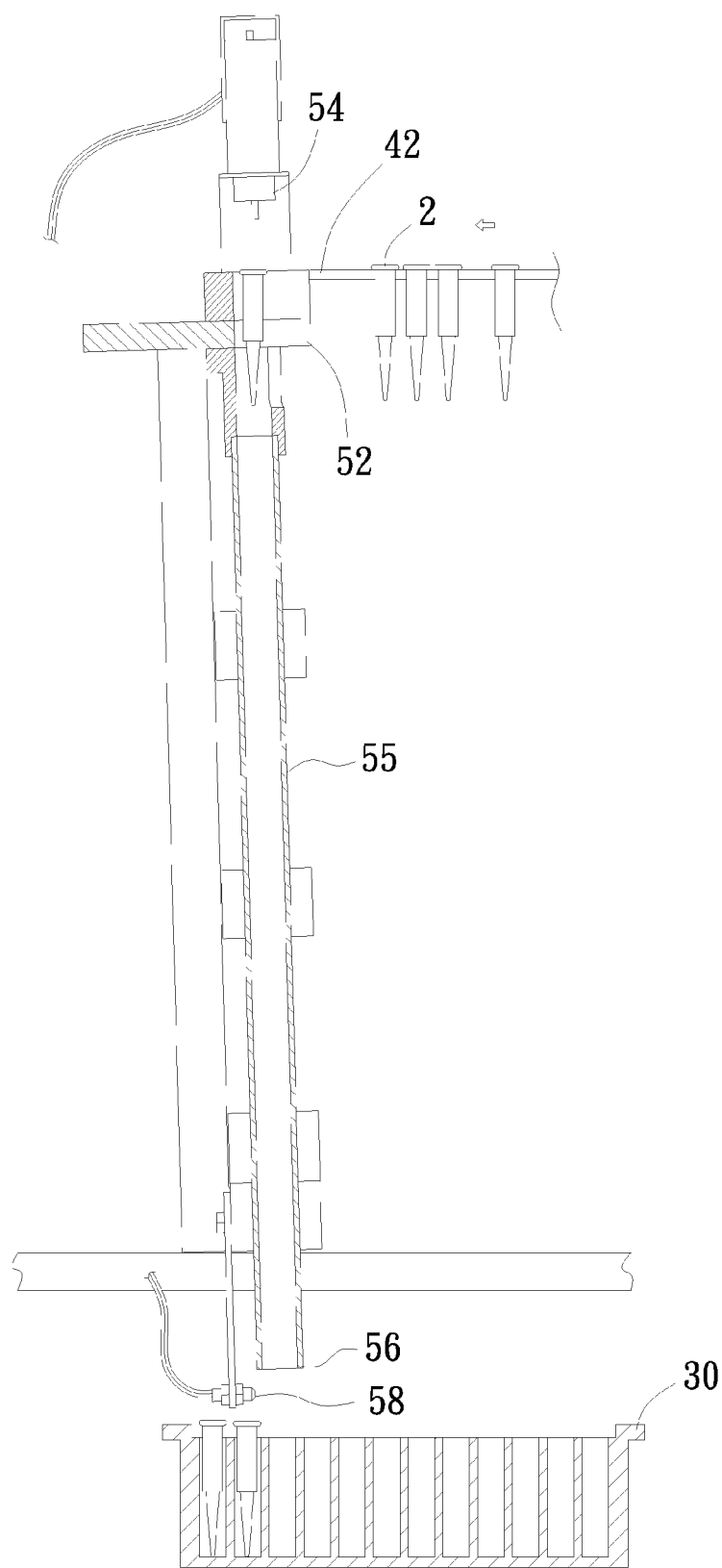
Figure 4C:
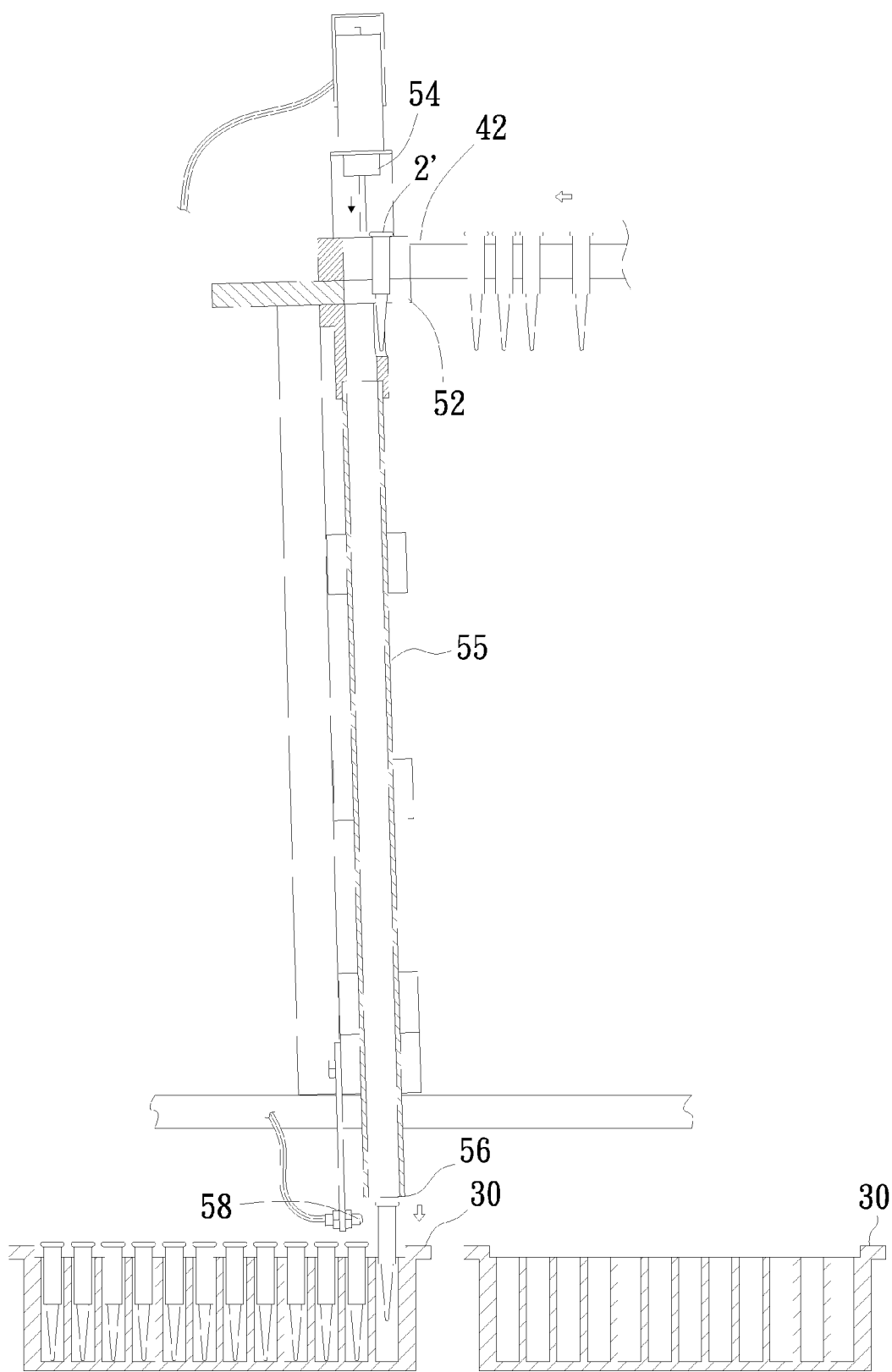

With reference to FIGS. 4A, 4B and 4C for a sorting and packaging a micropipette by a micropipette sorting and packaging system in accordance with a preferred embodiment of the present invention, the control unit 60 turns on the vibration tray 40 to scatter the micropipette 2 on the vibration tray 40 to enter into an external rim of the vibration tray 40, and guiding the micropipette 2 into the sorting rail 42. The micropipette 2 moves along the sorting rail 42 and enters into the feeding inlet 52 of the automatic discharge mechanism 50. Now, the control unit 60 controls the stop portion 54 to ascend and then descend immediately (as shown in FIG. 4B) to send the micropipette 2 into the long-strip rail 55, and block another micropipette 2' from entering (as shown in FIG. 4C). When the micropipette 2 is discharged from the outlet 56, the sensor 58 detects the micropipette 2 passing through the outlet 56 and transmits a signal to the control unit 60. After the control unit 60 controls the XY platform 20 to move the carrying platform 30 to a fixed position, the stop portion 54 is released to allow the micropipette 2' to enter into the long-strip rail 55.

Therefore, the micropipette sorting and packaging system of the present invention can replace the traditional robotic arm for the sieving and packaging work.

In summation of the description above, the present invention provides an automatic discharge mechanism to replace the conventional sorting and packaging design adopting a robotic arm and achieves the effects of reducing occupied space, lowering installation cost, and avoiding noisy sounds. Obviously, the present invention complies with the patent application requirements and the products manufactured in accordance with the present invention can meet the current market requirements.

While the invention has been described by means of specific embodiments, numerous modifications and variations could be made thereto by those skilled in the art without departing from the scope and spirit of the invention set forth in the claims.

What is claimed is:

1. A micropipette sorting and packaging system, comprising:
    a base;
    a XY platform, installed on the base, and moved in X-axis and Y-axis directions on the base;
    a carrying platform, installed on the XY platform;
    a vibration tray, installed on the base, and having a sorting rail disposed at an external rim of the vibration tray for sorting a micropipette;
    an automatic discharge mechanism, having a long-strip rail, and an upper end of the long-strip rail having a feeding inlet and a stop portion, and a lower end of the long-strip rail having an outlet and a sensor, and the feeding inlet being coupled to the sorting rail, and the outlet being aligned with the carrying platform; and
    a control unit, electrically coupled to the vibration tray, the automatic discharge mechanism and the XY platform, for controlling a sorting and packaging process.

2. The system of claim 1, wherein the stop portion is driven by an electromagnetic force.

3. The system of claim 1, wherein the stop portion is driven by a mechanical force.

4. The system of claim 1, wherein the sensor is an infrared sensor.

5. The system of claim 1, wherein the vibration tray has an external rim higher than an internal rim of the vibration tray.

* * * * *